(12) United States Patent
Mikada et al.

(10) Patent No.: US 9,726,773 B2
(45) Date of Patent: Aug. 8, 2017

(54) SUBAQUEOUS UNDERGROUND SURVEY SYSTEM AND SUBAQUEOUS UNDERGROUND SURVEY METHOD

(71) Applicants: IHI Corporation, Tokyo (JP); Hitoshi Mikada, Kyoto-shi, Kyoto (JP)

(72) Inventors: Hitoshi Mikada, Kyoto (JP); Hiroaki Ozasa, Tokyo (JP); Fumio Sato, Tokyo (JP); Shigeki Nagaya, Tokyo (JP); Akio Yamanishi, Tokyo (JP)

(73) Assignees: IHI CORPORATION, Tokyo (JP); Hitoshi Mikada, Kyoto (JP)

( * ) Notice: Subject to any disclaimer, the term of this patent is extended or adjusted under 35 U.S.C. 154(b) by 94 days.

(21) Appl. No.: 14/802,164

(22) Filed: Jul. 17, 2015

(65) Prior Publication Data

US 2015/0331128 A1    Nov. 19, 2015

Related U.S. Application Data

(63) Continuation of application No. PCT/JP2013/083441, filed on Dec. 13, 2013.

(30) Foreign Application Priority Data

Jan. 18, 2013    (JP) .................. 2013-007095

(51) Int. Cl.
*G01V 1/38* (2006.01)
*G01V 1/30* (2006.01)
(Continued)

(52) U.S. Cl.
CPC ............ *G01V 1/3808* (2013.01); *G01V 1/006* (2013.01); *G01V 1/284* (2013.01); *G01V 1/301* (2013.01);
(Continued)

(58) Field of Classification Search
CPC ...... G01V 1/006; G01V 1/284; G01V 1/3808; G01V 1/3817; G01V 1/301; G01V 2210/64; G01V 2210/127
(Continued)

(56) References Cited

U.S. PATENT DOCUMENTS 4,242,740 A * 12/1980 Ruehle ................. G01V 1/3808
181/111
4,286,332 A     8/1981 Edelmann
(Continued)

FOREIGN PATENT DOCUMENTS

JP    63-502138 A    8/1988
JP    2008-014830 A    1/2008
(Continued)

OTHER PUBLICATIONS

Extended European Search Report, European Patent Application No. 13871972.9, Aug. 1, 2016, 7 pgs.
(Continued)

*Primary Examiner* — Daniel L Murphy
(74) *Attorney, Agent, or Firm* — Volpe and Koenig, P.C.

(57) ABSTRACT

A subaqueous underground survey system using a reflection seismic survey method includes: multiple sound sources 1 for generating sound waves in the water; a controller 2 for controlling phases of the sound waves; a geophone 3 for receiving reflected waves of the sound waves; and an observation ship 4 equipped with the sound sources 1, wherein the controller 2 controls phases of the sound sources 1 so that the sound waves generated from the respective sound sources 1 have a phase difference at a water bottom surface B, thereby controlling generation of shear waves to propagate into the ground.

6 Claims, 20 Drawing Sheets

(51) Int. Cl.
*G01V 1/00* (2006.01)
*G01V 1/28* (2006.01)

(52) U.S. Cl.
CPC ...... *G01V 1/3817* (2013.01); *G01V 2210/127* (2013.01); *G01V 2210/64* (2013.01)

(58) Field of Classification Search
USPC .......................................................... 367/16
See application file for complete search history.

(56) References Cited

U.S. PATENT DOCUMENTS

| | | |
|---|---|---|
| 4,735,281 A | 4/1988 | Pascouet |
| 4,843,597 A | 6/1989 | Gjessing et al. |
| 4,858,201 A | 8/1989 | Goins et al. |
| 4,918,668 A | 4/1990 | Sallas |
| 2005/0197780 A1 | 9/2005 | Moos et al. |
| 2010/0103772 A1 | 4/2010 | Eick et al. |

FOREIGN PATENT DOCUMENTS

| | | |
|---|---|---|
| SU | 1109072 A | 8/1984 |
| SU | 1262434 A1 | 10/1986 |

OTHER PUBLICATIONS

International Search Report, PCT/JP2013/083441, Feb. 10, 2014, 1 pg.

Shinichi Matsuzawa, "Reservoir Analysis Technology Using S-Waves", Oil & Natural Gas Review, Japan Oil, Gas and Metals National Corporation (JOGMEC), vol. 41, No. 5, Sep. 2007, p. 91-103 with English translation.

* cited by examiner

SUBAQUEOUS UNDERGROUND SURVEY SYSTEM AND SUBAQUEOUS UNDERGROUND SURVEY METHOD

TECHNICAL FIELD

The present invention relates to a subaqueous underground survey system and a subaqueous underground survey method, and in particular to a subaqueous underground survey system and a subaqueous underground survey method using a reflection seismic survey method.

BACKGROUND ART

Continental shelves and deep-sea floors are rich in resources (such as oil, natural gas, methane hydrate, polymetallic nodule, manganese crust, and submarine hydrothermal deposit), and demands for development of marine resources have been increased because of recent steep rise in price of resources. Terrestrial natural resources are unevenly distributed in particular regions, and people should rely on importation from abroad for resources with small domestic production volumes; thus there are not a few geopolitical risks. In Japan surrounded by the seas, in the light of stable supply of resources, ocean areas have been focused as a new frontier for resources development.

As a seabed resources survey technology, such a technology that uses a reflection seismic survey method has already been proposed (see Patent Document 1, and Non-Patent Document 1, for example).

Patent Document 1 describes the following: "generating vibrations (sound waves) near a surface of the sea, in the sea, or at the seabed using a vibration source (wave transmitter), such as an air gun that bursts compressed air into the water, a piezoelectric element, and a super magnetostriction alloy; receiving sound waves reflected and returned from surfaces of the seabed, boundary surfaces of strata under the seabed, or the like on hydrophones (receivers) arranged with intervals on a cable called as a streamer; and performing a survey on boundary surfaces of the strata having different physical properties, which are revealed in the above received records, that is, seismic survey records under the seabed so as to analyze the geological structures".

Non-Patent Document 1 describes that S-waves (shear waves) have features of being hardly affected by fluids in pore spaces compared to P-waves (compressional waves), and becoming separated after penetrating a stratum where fractures are grown, etc.; and S-waves enable a grasp of structures of oil and gas reservoirs and properties of the reservoirs, which is hard to be attained by using a P-waves seismic reflection survey alone; therefore, the S-wave seismic reflection survey has come under the spotlight.

PRIOR ART DOCUMENT

Patent Document

Patent Document 1: Japanese Patent Application Laid-Open Publication No. 2008-14830

Non-Patent Document

Non-Patent Document 1: Shinichi Matsuzawa, "Reservoir Analysis Technology Using S-Waves", Oil & Natural Gas Review, Japan Oil, Gas and Metals National Corporation (JOGMEC), Vol. 41, No. 5, September 2007, p. 91-103

SUMMARY OF THE INVENTION

Problems to be Solved by the Invention

As described in Non-Patent Document 1, there is a problem that an S-wave (shear wave) does not propagate in the sea, and thus no effective S-wave as a seismic source is available in sea areas. To counter this problem, Non-Patent Document 1 describes utilizing a P-S converted wave, where a P-wave (compressional wave) propagating in the water is converted into an S-wave (shear wave) at the seabed.

Unfortunately, in order to obtain sufficient P-S converted waves required for analysis from P-waves generated by a seismic source such as a single air gun in the water, not only a tremendously great sound pressure is required, but also soil properties of the seabed become a great constrain. Consequently, such problems come up as influences on marine organisms, such as marine mammals, as well as difficulty in control of generation of S-waves (shear waves), which hinders a stable survey.

An object of the present invention, which has been made in order to solve the problems according to the conventional art, is to provide a subaqueous underground survey system and a subaqueous underground survey method capable of controlling generation of shear waves, and performing a stable survey.

Means for Solving the Problems

According to the present invention, provided is a subaqueous underground survey system using a reflection seismic survey method, the subaqueous underground survey system including multiple sound sources for generating sound waves in water; a controller for controlling phases of the sound waves; a geophone for receiving reflected waves of the sound waves; and survey equipment equipped with the sound sources, wherein the controller controls heights in the water or phases of the sound sources so that the sound waves generated from the respective sound sources have a phase difference at a water bottom surface, thereby controlling generation of shear waves to propagate into the ground.

The controller may control the heights in the water of the sound sources to deviate from each other by a half wavelength of a sound wave to be generated, or may control a phase difference of the sound sources to be a half cycle. Furthermore, the sound sources may be towed by the survey equipment. Furthermore, the geophone may be towed-type geophone or water-bottom installed-type geophone.

According to the present invention, provided is a subaqueous underground survey method using a reflection seismic survey method, the subaqueous underground survey method including: a controlling step of controlling heights in water or phases of sound sources so that sound waves generated from the respective sound sources have a phase difference at a water bottom surface; a generating step of generating the sound waves in the water from the sound sources; a shear-wave propagating step of generating shear waves by the sound waves at the water bottom surface so as to allow the shear waves to propagate into the ground; a receiving step of receiving reflected waves of the shear waves; and an analysis step of analyzing geological structures using received data on the reflected waves.

The controlling step may include a step of controlling the heights in the water of the sound sources to deviate from each other by a half wavelength of a sound wave to be generated, or a step of controlling the phase difference of the sound sources to be a half cycle. Furthermore, the generating step may include generating the sound waves at a water surface or in the water while towing the sound sources. Furthermore, the receiving step may include a step of receiving compressional waves generated from the reflected waves at the water bottom surface and propagating in the water, or a step of receiving the reflected waves at the water bottom surface while the reflected waves remain as the shear waves.

Advantageous Effects of the Invention

According to the aforementioned subaqueous underground survey system and the aforementioned subaqueous underground survey method, a phase difference is applied to sound waves that are generated from the multiple sound sources, thereby positively generating shear waves to propagate from the water bottom surface into the ground. Hence, according to the present invention, it is possible to control generation of the shear waves, thereby enabling a stable subaqueous underground survey.

MODE FOR CARRYING OUT THE INVENTION

Figure 1:
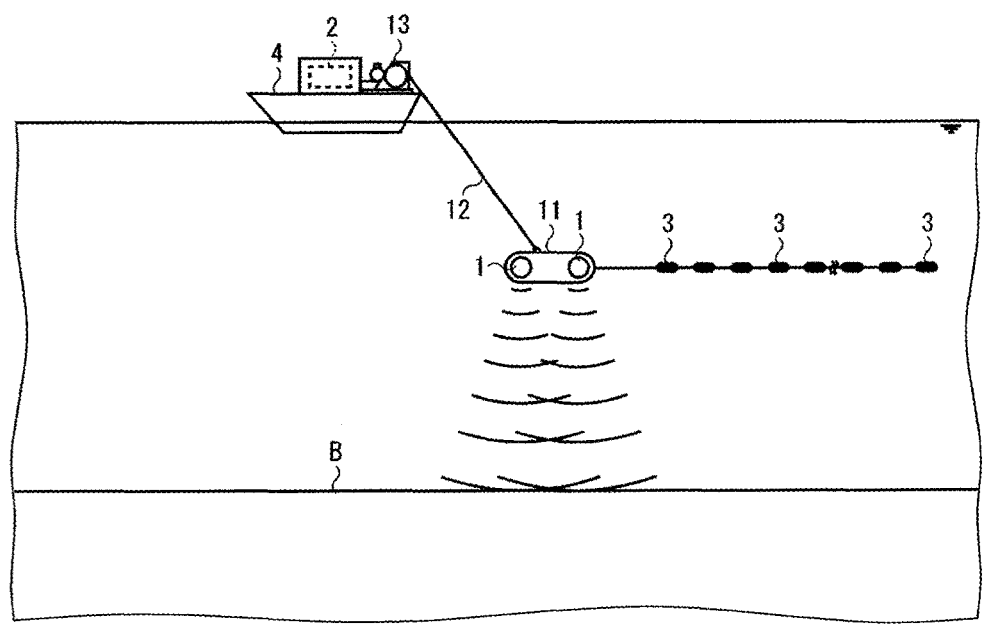
FIG. 1 is a general diagram of a subaqueous underground survey system according to the first embodiment of the present invention, showing when generating waves.
Figure 2:
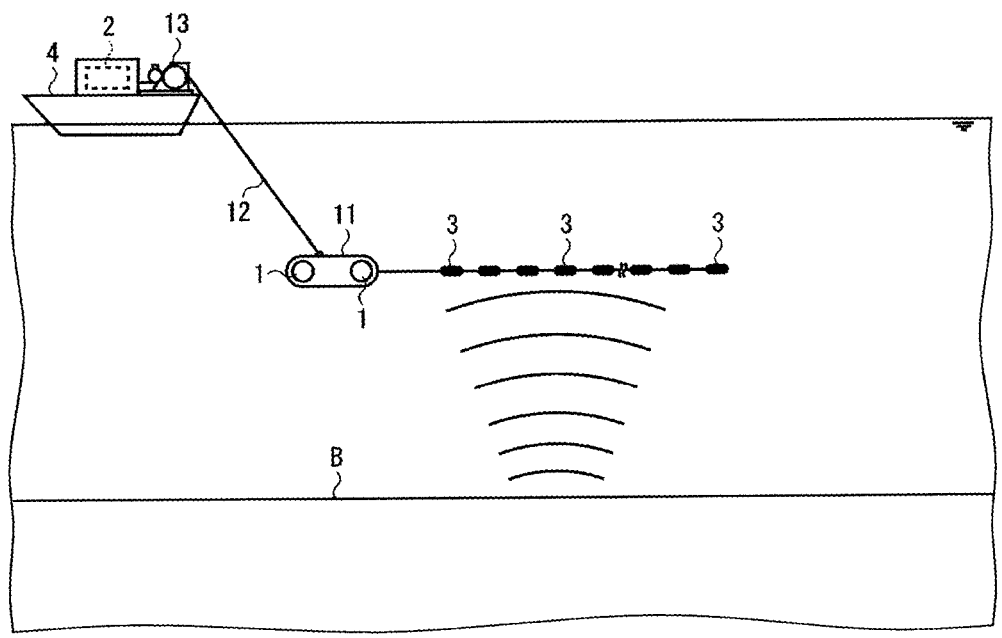
FIG. 2 is a general diagram of the subaqueous underground survey system according to the first embodiment of the present invention, showing when receiving waves.
Figure 3:
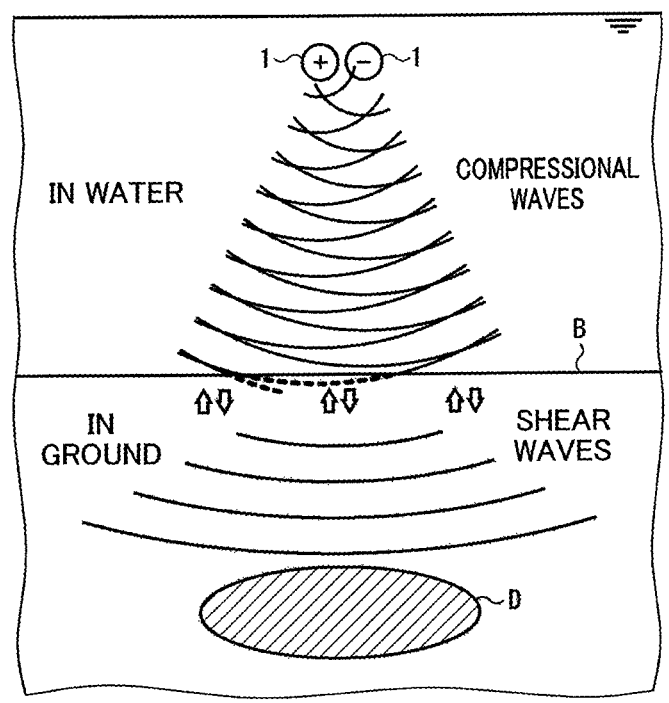
FIG. 3 is a conceptual diagram showing a subaqueous underground survey method according to the first embodiment of the present invention, showing when generating waves.
Figure 4:
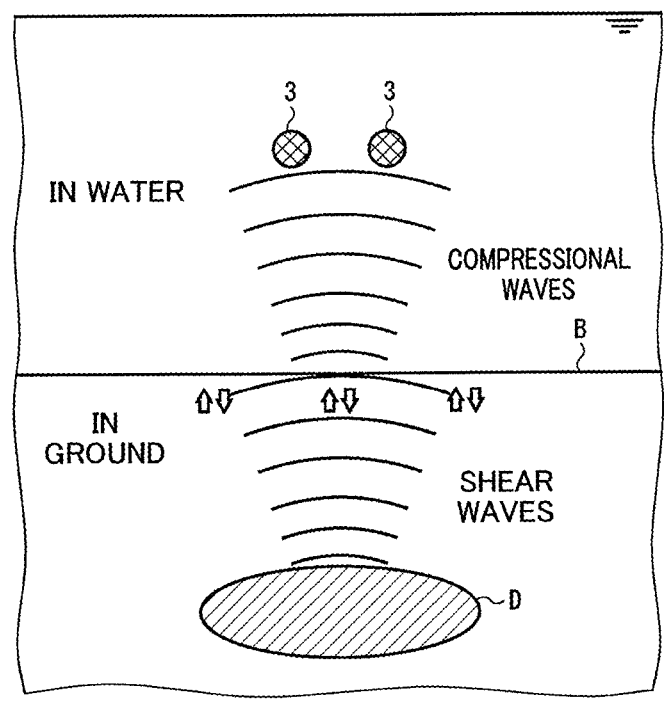
FIG. 4 is a conceptual diagram showing a subaqueous underground survey method according to the first embodiment of the present invention, showing when receiving waves.

Hereinafter, embodiments of the present invention will be described with reference to FIG. 1 to FIG. 20. FIG. 1 is a general diagram of a subaqueous underground survey system according to the first embodiment of the present invention, showing when generating waves; and FIG. 2 is a general diagram of the subaqueous underground survey system according to the first embodiment of the present invention, showing when receiving waves. FIG. 3 is a conceptual diagram showing a subaqueous underground survey method according to the first embodiment of the present invention, showing when generating waves; and FIG. 4 is a conceptual diagram showing a subaqueous underground survey method according to the first embodiment of the present invention, showing when receiving waves.

The subaqueous underground survey system according to the first embodiment of the present invention is a subaqueous underground survey system using a reflection seismic survey method, as shown in FIG. 1 and FIG. 2, and includes multiple sound sources 1 for generating sound waves in the water, a controller 2 for controlling phases of the sound waves, a geophone 3 for receiving reflected waves of the sound waves, and an observation ship 4 equipped with the sound sources 1; and the controller 2 controls phases of the sound sources 1 such that sound waves respectively generated from the sound sources 1 have a phase difference at a water bottom surface B, thereby controlling generation of shear waves (also referred to as "S-waves" or "transversal waves") to propagate into the ground.

The subaqueous underground survey system according to the present embodiment is generally directed to an ocean resources survey, but the system is not limited to this, and may be applicable in any areas with water, such as river areas, and lake and marsh areas. Specifically, in the present embodiments, the term "subaqueous" is relevant to any areas containing water, such as ocean areas, river areas, and lake and marsh areas.

Each sound source 1 is a low-frequency generator 11 using a hydraulic servomechanism, for example. An underwater sound source apparatus described in Japanese Patent Application Laid-Open Publication No. 8-280089 may be used as the low-frequency generator 11, for example. The low-frequency generator includes at least one pair of (i.e., two) sound sources 1, and each sound source 1 is configured to generate sound waves at a desired frequency by hydraulically controlling vibrations of a vibrating plate. The respective sound sources 1 are configured to generate different sound waves from each other so as to generate sound waves in different phases.

The sound waves generated in the water by the sound sources 1 are compressional waves (also referred to as "P-waves", or "longitudinal waves"). The sound source 1 is not limited to the aforementioned hydraulic servo-type low-frequency generator 11, and a sound source of any other type, such as a piezoelectric element driving-type sound source, may be employed as far as the sound source can control the phase of sound waves to be generated.

The controller 2 is configured to individually control the phase of sound waves generated by each sound source 1. The controller 2 may be installed in the observation ship 4, or installed in the low-frequency generator 11. The controller 2 has a function of controlling the frequency of the sound waves generated by each sound source 1, as well. The sound waves generated in the water from each sound source 1 preferably has a low-frequency of approximately 10 to 100 Hz, for example, and if the aforementioned hydraulic servo-type low-frequency generator is adopted, it is possible to generate sound waves up to a frequency of approximately 200 to 300 Hz.

The geophone 3 may be formed of a streamer cable (towed-type geophone) made by coupling multiple hydrophones to a cable, for example. The geophone 3 may be connected to the low-frequency generator 11 as shown in the drawings, or may be placed into the water from the observation ship 4 through a lifting apparatus other than the low-frequency generator 11; or the sound sources 1 may be towed by a towing boat other than the observation ship 4. As shown in the drawings, the low-frequency generator 11 and the geophone 3 are placed in the water at a position of approximately 100 to 500 m from the water bottom surface B, for example, and are connected to the observation ship 4 to be towed with a tow line 12.

The observation ship 4 constitutes survey equipment for placing the sound sources 1 in the water. The observation ship 4 is a so-called towing boat, and is operated to generate sound waves in the water while towing the low-frequency generator 11 and the geophone 3 as shown in FIG. 1; and receive reflected waves while towing the low-frequency generator 11 and the geophone 3, as shown in FIG. 2. The observation ship 4 includes the tow line 12 connected to the low-frequency generator 11 and the geophone 3, and the lifting apparatus 13 that supports the tow line 12 so as to wind up or rewind the tow line 12, for example. The survey equipment including the sound sources 1 is not limited to a vessel like the observation ship 4, and any equipment, such as an observation buoy, a floating platform, a drilling rig, a semi-submersible drilling unit, a submarine, and an underwater sailing body, may be used as far as the equipment is capable of placing the sound sources into the water in a predetermined subaqueous area.

Hereinafter, the subaqueous underground survey method according to the present embodiment will be described with reference to FIG. 1 to FIG. 4. The subaqueous underground survey method according to the present embodiment is a subaqueous underground survey method using the seismic reflection survey method; and includes a controlling step of controlling phases of the sound sources 1 so that sound waves respectively generated from the multiple sound sources 1 have a phase difference at the water bottom surface B, a generating step of generating sound waves (compressional waves) in the water from the sound sources 1, a shear-wave propagating step of generating shear waves from the sound waves (compressional waves) at the water bottom surface B so as to allow the shear waves to propagate into the ground, a receiving step of receiving reflected waves of the shear waves, and an analyzing step of analyzing geological structures using received data on the reflected waves.

The controlling step is a step of individually controlling the phase of each of the multiple sound sources 1 through the controller 2, thereby generating a phase difference at the water bottom surface B. Specifically, this step is for controlling a phase difference of the sound sources 1 to be a half cycle. In the case of setting the phase difference of the sound sources 1 to be a half cycle, a pair of the sound sources generates sound waves having opposite phases to each other in the water. The phase difference of the sound sources 1 is not limited to a half cycle, and may be set to be any cycle within a range of 0 to ½ cycles, for example, as far as there is a phase difference.

The generating step is a step of generating sound waves having different phases in the water from at least one pair of (i.e., two) the sound sources 1. At this time, as shown in FIG. 1, the sound waves may be generated in the water while the sound sources 1 are towed, or the sound waves may be generated from the sound sources 1 connected to the stopped observation ship 4 or to survey equipment located in a predetermined subaqueous area so as to perform a fixed-point observation.

The shear-wave propagating step is a step of generating shear waves at the water bottom surface B based on the sound waves (compressional waves) generated from the sound sources 1. As shown in FIG. 3, if the sound waves to which a phase difference is applied (a state in which a phase difference is applied is illustrated using symbols "+" and "−" in the drawing) are generated in the water from the pair of the sound sources 1, the compressional waves propagate in the water. The two different compressional waves having reached the water bottom surface B have a phase difference; therefore, there is a difference in density of compression and rarefaction in the traveling directions of the sound waves when both sound waves interfere each other on the water bottom surface B, and particularly if one is a progressive wave, and the other is a regressive wave, the horizontal components thereof along the water bottom surface B are amplified, so that shear waves are likely to be generated. In the present embodiment, it is possible to control the sound waves (compressional waves) generated in the water from the sound sources 1, and control magnification of the shear waves to be generated at the water bottom surface B at any level, depending on the conditions, such as the length, the amplitude (sound pressure), and the phase difference of the compressional waves, and the distance between the sound sources 1. In the present embodiment, it is possible to control generation of the shear waves, thereby reducing influences of soil properties of the water bottom surface B.

As shown in FIG. 3, the receiving step is a step of receiving reflected waves of the shear waves reflected on a stratum or a deposit D. The shear waves generated in the shear-wave propagating step propagate into the ground, and if a mass or a layer of liquid or gases exists under the ground, part of the shear waves are reflected thereon. When reaching the water bottom surface B, the reflected shear waves generate compressional waves, and then the compressional waves derived from the shear waves propagate in the water. These compressional waves derived from the shear waves are received on the geophone 3.

If the compressional waves propagate into the ground, the compressional waves as well as the shear waves propagate into the ground, and when reaching a mass or a layer of liquid or gasses, the compressional waves are greatly attenuated; thus it is usually difficult to receive reflected waves thereof.

The analyzing step is a step of analyzing geological structures using received data (receiving time, sound pressure distribution, etc.) on the reflected waves (compressional waves derived from the shear waves). Specifically, the geological structures are analyzed by processing the received data received by the geophone 3 with a computer (not shown) in which analyzing programs are installed.

The geophone 3 chiefly receive the reflected waves of the compressional waves generated from the sound sources 1, which are reflected on the water bottom surface B, and a stratum or the deposit D under the water bottom surface B, and also receive the aforementioned reflected waves of the shear waves; it is possible to distinguish whether the received waves are the reflected waves derived from the compressional waves or the reflected waves derived from the shear waves depending on the receiving time and the magnitude of the sound pressure; and by using the compressional waves derived from the shear waves, it is possible to analyze the geological structures, which cannot be clarified by using prior arts.

In the present embodiment, it is possible to receive even the reflected waves of the compressional waves reflected on the water bottom surface B and solid deposits; therefore, it is also possible to analyze the water bottom surface B and the structures under the ground using the received data on the reflected waves derived from the compressional waves. In particular, a more detailed and accurate resources survey can be performed through a survey in the same subaqueous area using both the received data on the reflected waves derived from the shear waves and the received data on the reflected waves derived from the compressional waves.

Figure 5:
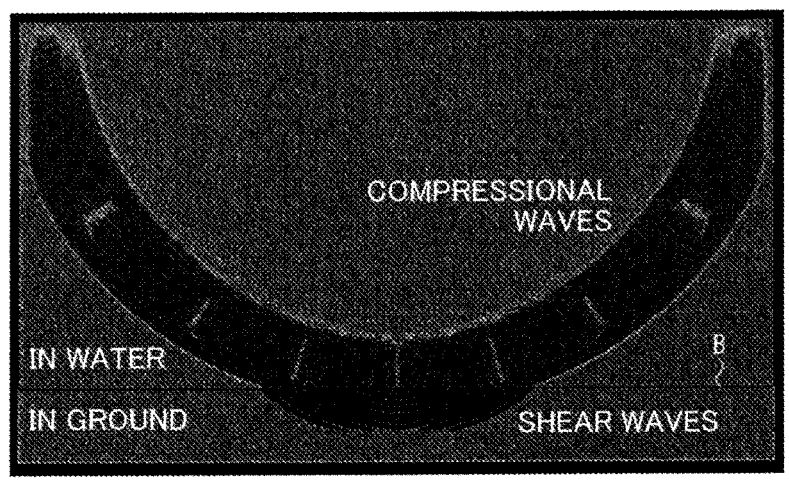
FIG. 5 is a diagram showing a state of generated shear waves at a water bottom surface, showing the case of having opposite phases.
Figure 6:
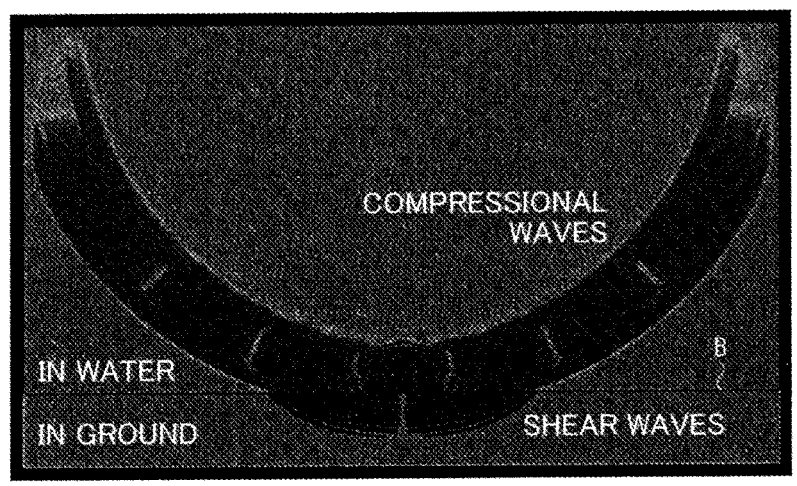
FIG. 6 is a diagram showing a state of generated shear waves at the water bottom surface, showing the case of having coordinate phases.
Figure 7:
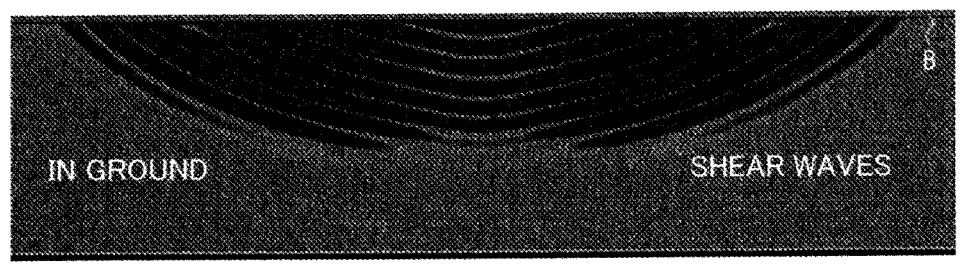
FIG. 7 is an enlarged view showing a state of generated waves at the water bottom surface, showing shear waves having opposite phases.
Figure 8:
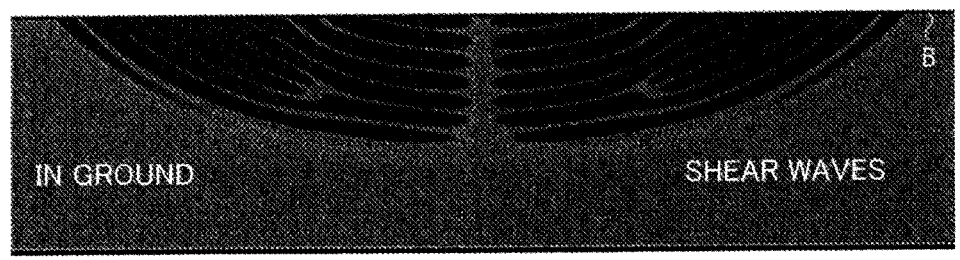
FIG. 8 is an enlarged view showing a state of generated waves at the water bottom surface, showing shear waves having coordinate phases.
Figure 9:
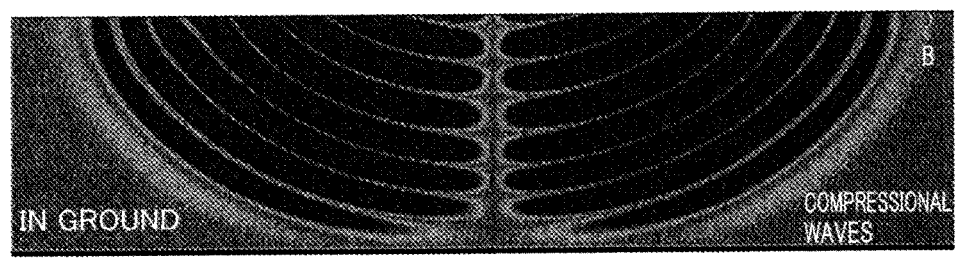
FIG. 9 is an enlarged view showing a state of generated waves at the water bottom surface, showing compressional waves having opposite phases.
Figure 10:
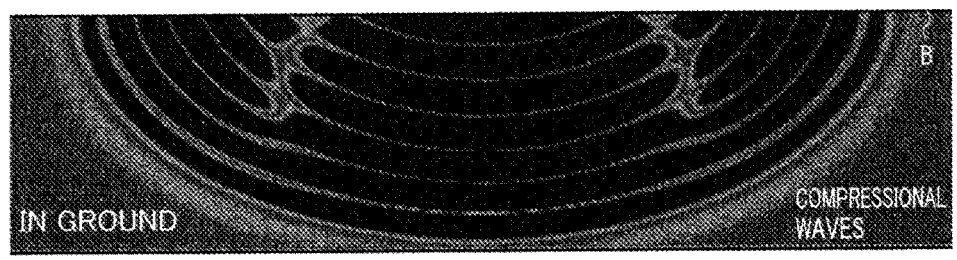
FIG. 10 is an enlarged view showing a state of generated waves at the water bottom surface, showing compressional waves having coordinate phases.

Herein, results of simulation about generation state of the shear waves will be described with reference to FIG. 5 to FIG. 10. FIG. 5 is a diagram showing a state of generated shear waves at the water bottom surface in the case of having opposite phases; FIG. 6 is a diagram showing a state of generated shear waves at the water bottom surface in the case of having coordinate phases. FIG. 7 is an enlarged view showing a state of generated waves at the water bottom surface, showing shear waves having opposite phases; FIG. 8 is an enlarged view showing a state of generated waves at the water bottom surface, showing shear waves having coordinate phases; FIG. 9 is an enlarged view showing a state of generated waves at the water bottom surface, showing compressional waves having opposite phases; and FIG. 10 is an enlarged view showing a state of generated waves at the water bottom surface, showing compressional waves having coordinate phases.

FIG. 5 to FIG. 10 show results of the simulation about propagation state of sound waves at 0.36 seconds after generating the sound waves at 200 Hz in the water with two sound sources (dipole sound sources) placed at a position of 500 m from the water bottom surface with a distance of 26.4 m (equivalent to 3.5 wavelengths) between the sound sources. In FIG. 5 and FIG. 6, compressional waves also propagated under the ground, but only shear waves are shown in the drawings for convenience of explanation.

FIG. 5 shows a case in which sound waves having opposite phases were generated from the sound sources 1. As shown in the drawing, the compressional waves having propagated in the water generate shear waves at the water bottom surface B, which results in continuous shear waves in a substantially semi-circular shape that propagate into the ground. This condition can be seen more clearly in the enlarged view of FIG. 7. According to the enlarged view of FIG. 7, it can readily be appreciated that the shear waves generated under the ground continue in a substantially semi-circular shape, and shear waves are further generated at a center portion of the shear waves in the vertical direction to the water bottom surface B.

Generally, in the subaqueous underground survey using the seismic reflection survey method, reflected waves of shear waves obliquely propagating from the water bottom surface B into the ground are likely to flow in the horizontal direction along the water bottom surface B; therefore, it is difficult to receive these reflected waves (i.e., compressional signals derived from shear waves) on the geophone 3. Hence, in the subaqueous underground survey using the seismic reflection survey method, it is important to generate such shear waves that vertically propagate from the water bottom surface B.

To the contrary, FIG. 6 shows a case in which sound waves having coordinate phases were generated from the sound sources 1. As shown in the drawing, compressional waves having propagated in the water generate shear waves at the water bottom surface B, and then the discontinuous shear waves separated at the center portion thereof propagate under the ground. This condition can be seen more clearly in the enlarged view of FIG. 8. According to the enlarged view of FIG. 8, it can readily be appreciated that the shear waves generated in the ground are discontinuously separated into two, each of which is in a substantially quarter circular shape, and no shear waves are generated at the center portion of the shear waves in the vertical direction to the water bottom surface B.

As described above, because the compressional waves also propagate from the water bottom surface into the ground, the condition of this is shown in FIG. 9 and FIG. 10. The waves shown in FIG. 9 are compressional waves having opposite phases, and the waves shown in FIG. 10 are compressional waves having coordinate phases. As shown in these drawings, a converse phenomenon to that in the shear waves occurs in the compressional waves propagating from the water bottom surface B into the ground, and the compressional waves having opposite phases are discontinuously separated into two, each of which is in a substantially quarter circular shape, but the compressional waves having the coordinate phases are continued in a substantially semi-circular shape.

In general, since the compressional waves have a smaller index of refraction compared to that of the shear waves, it is possible to receive, on the geophone 3, even the reflected waves of the compressional waves that have obliquely propagated from the water bottom surface B into the ground. Accordingly, even the compressional waves having a waveform shown in FIG. 9 is useful for analysis of the geological structures. Specifically, in the case of generating sound waves having different phases from a pair of the sound sources 1, not only the shear waves generated at the water bottom surface B but also the compressional waves propagating underground can be used for analyzing the geological structures; therefore, more accurate or more detailed analysis results can be obtained in combination with the both analysis results.

According to the aforementioned subaqueous underground survey system and the aforementioned subaqueous underground survey method, it is possible to positively generate the shear waves that propagate from the water bottom surface B into the ground by applying a phase difference to the sound waves that are generated from the multiple sound sources. Consequently, according to the present invention, it is possible to control generation of the shear waves by controlling phases, sound pressures, or the like of the compressional waves from which the shear waves are generated, thereby performing a stable subaqueous underground survey.

Figure 11:
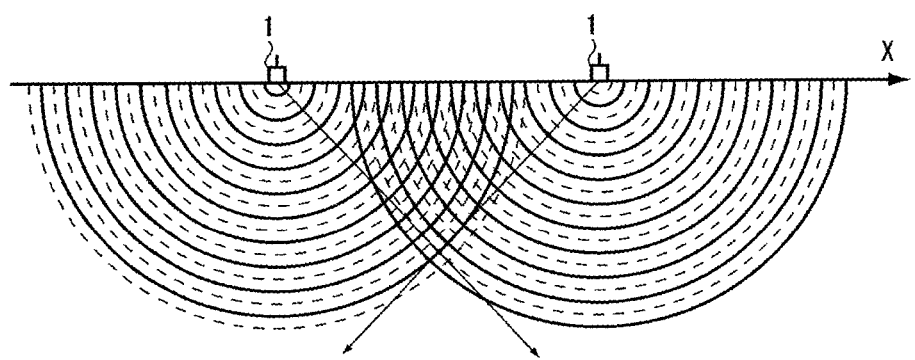
FIG. 11 is a diagram showing a relation of a distance between sound sources with generation of the shear waves, showing a spaced apart state of the sound sources.
Figure 12:
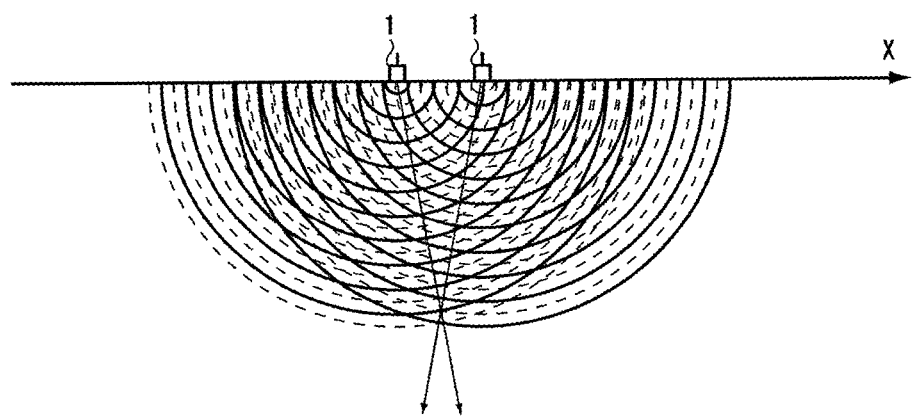
FIG. 12 is a diagram showing a relation of a distance between the sound sources with generation of the shear waves, showing a close state of the sound sources.

FIG. 11 is a drawing showing a relation of a distance between the sound sources with generation of the shear waves, showing a spaced apart state of the sound sources, and FIG. 12 is a drawing showing a relation of a distance between the sound sources with generation of the shear waves, showing a close state of the sound sources. In FIG. 11 and FIG. 12, peaks of the sound waves (compressional waves) generated in the water from the sound sources 1 are illustrated by solid lines, and troughs thereof are illustrated by broken lines. Note that the water bottom surface is omitted in FIG. 11 and FIG. 12 for convenience of explanation.

As shown in FIG. 11, in the case of increasing the distance between the sound sources 1, the horizontal components in an area where the sound waves (compressional waves) propagating in the water interfere each other become greater, compared to FIG. 12, which results in increase in amplitude (or sound pressure) of the shear waves generated at the water bottom surface. Accordingly, it is preferable to set the distance between the pair of the sound sources 1 to be as great as possible.

In order to bring the sound waves to interfere each other at the water bottom surface as planned to generate desired shear waves, it is preferable to set the multiple sound sources 1 to have the same height in the water as much as possible. For example, in the case of generating, from the pair of the sound sources 1, sound waves at 100 Hz having a phase difference by a half cycle (i.e., having opposite phases), if the heights in the water of the pair of the sound sources 1 deviate by a half wavelength (7.4 m), this is equivalent to a case of generating sound waves having the coordinate phases; therefore, the heights in the water of the sound sources 1 (low-frequency generator 11) have to be controlled such that an error in height in the water of the sound sources 1 becomes less than a half wavelength. The height of each sound source 1 can readily be controlled with a hydraulic gauge.

Figure 13:
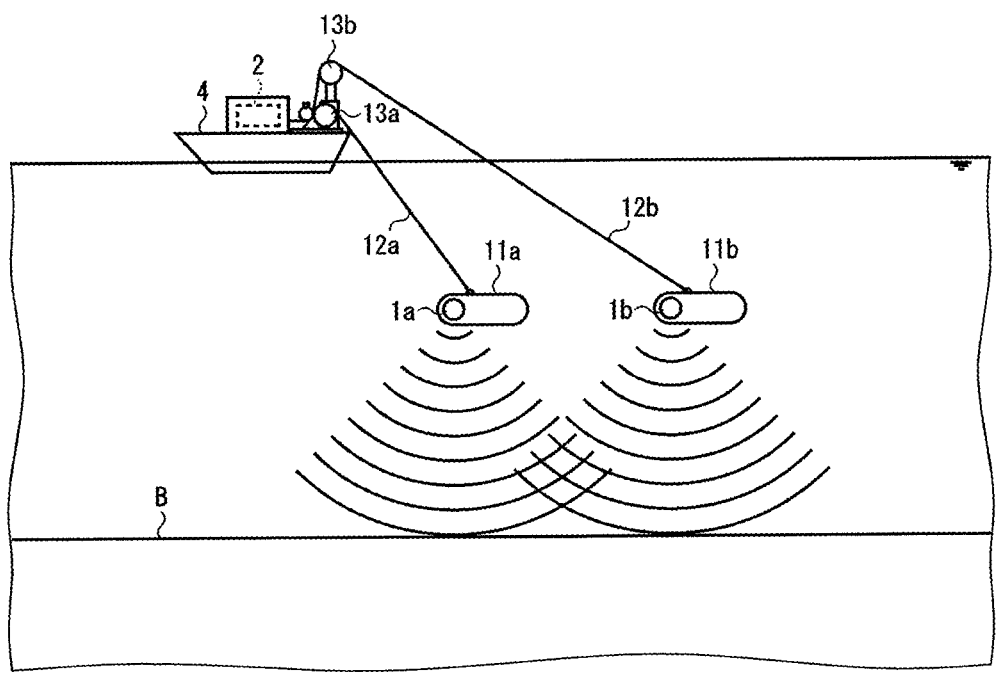
FIG. 13 is a general diagram of the subaqueous underground survey system according to other embodiments of the present invention, showing the second embodiment of the system.
Figure 14:
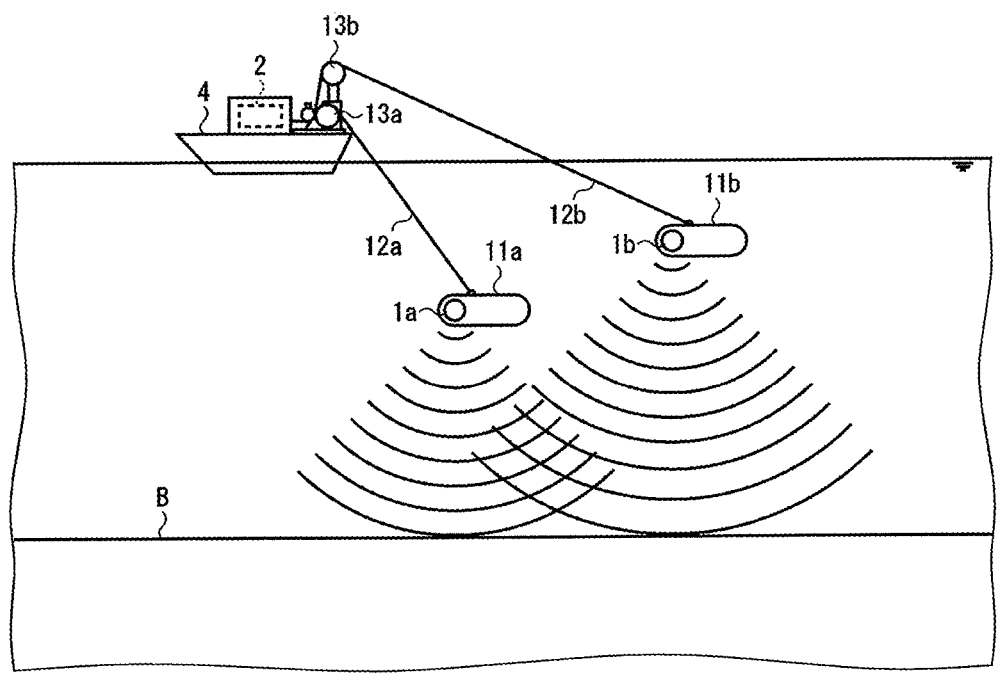
FIG. 14 is a general diagram of the subaqueous underground survey system according to other embodiments of the present invention, showing the third embodiment of the system.
Figure 15:
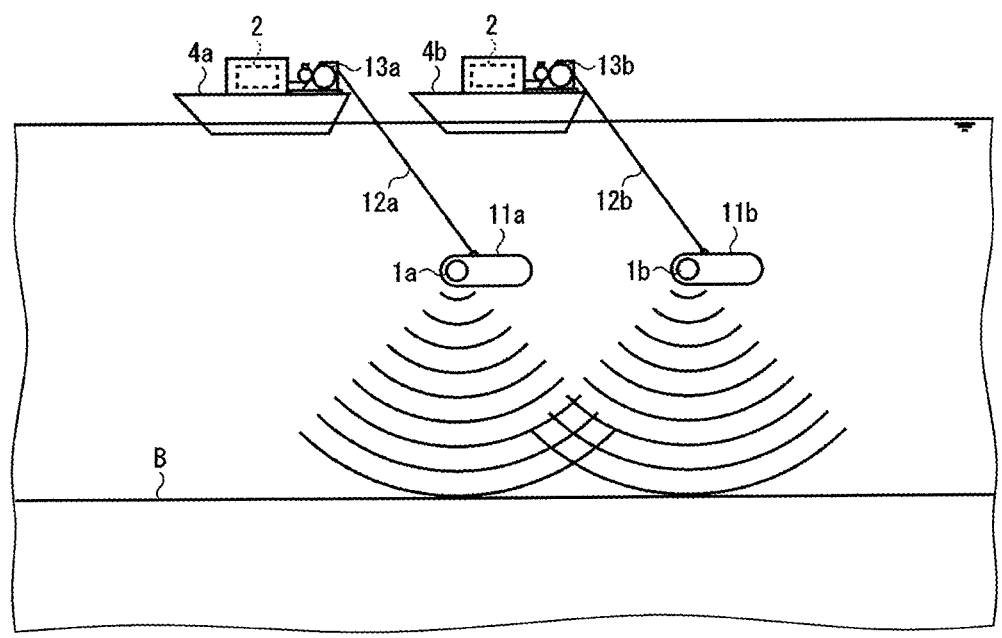
FIG. 15 is a general diagram of the subaqueous underground survey system according to other embodiments of the present invention, showing the fourth embodiment of the system.
Figure 16:
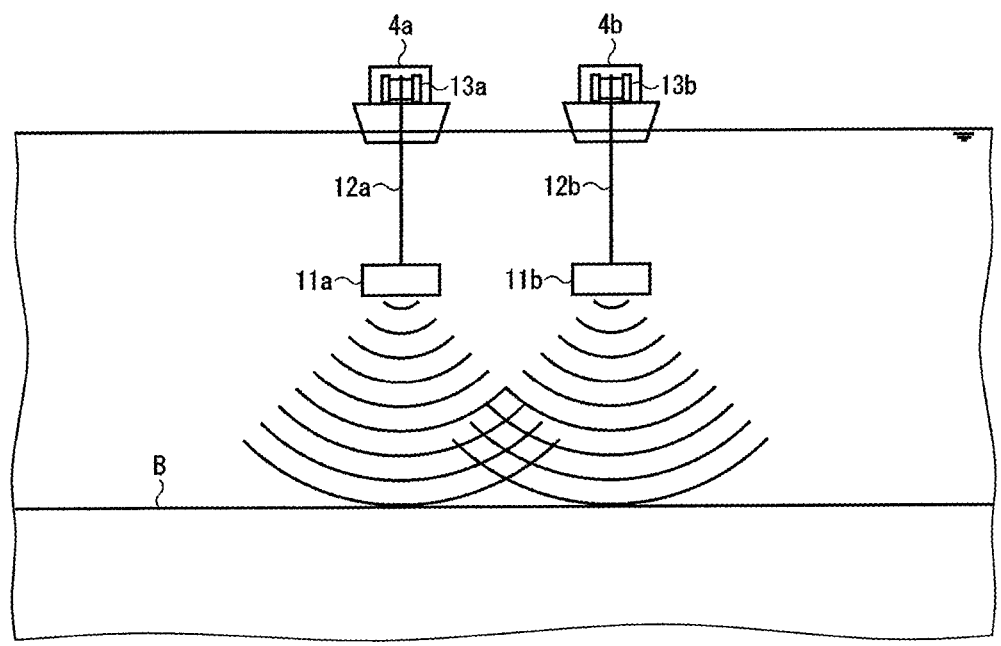
FIG. 16 is a general diagram of the subaqueous underground survey system according to other embodiments of the present invention, showing the fifth embodiment of the system.
Figure 17:
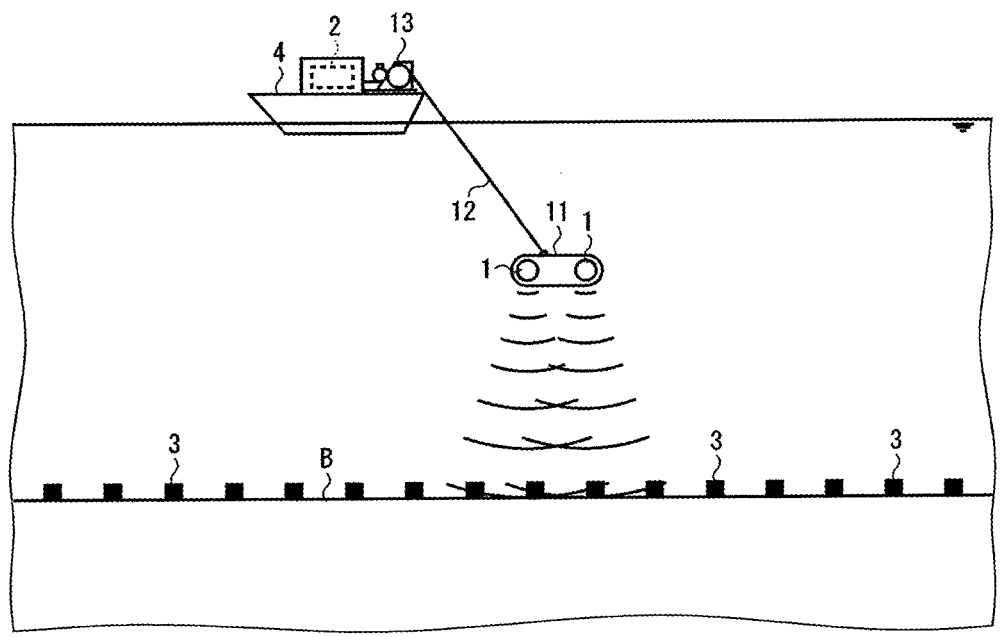
FIG. 17 is a general diagram of the subaqueous underground survey system according to other embodiments of the present invention, showing the sixth embodiment of the system.
Figure 19:
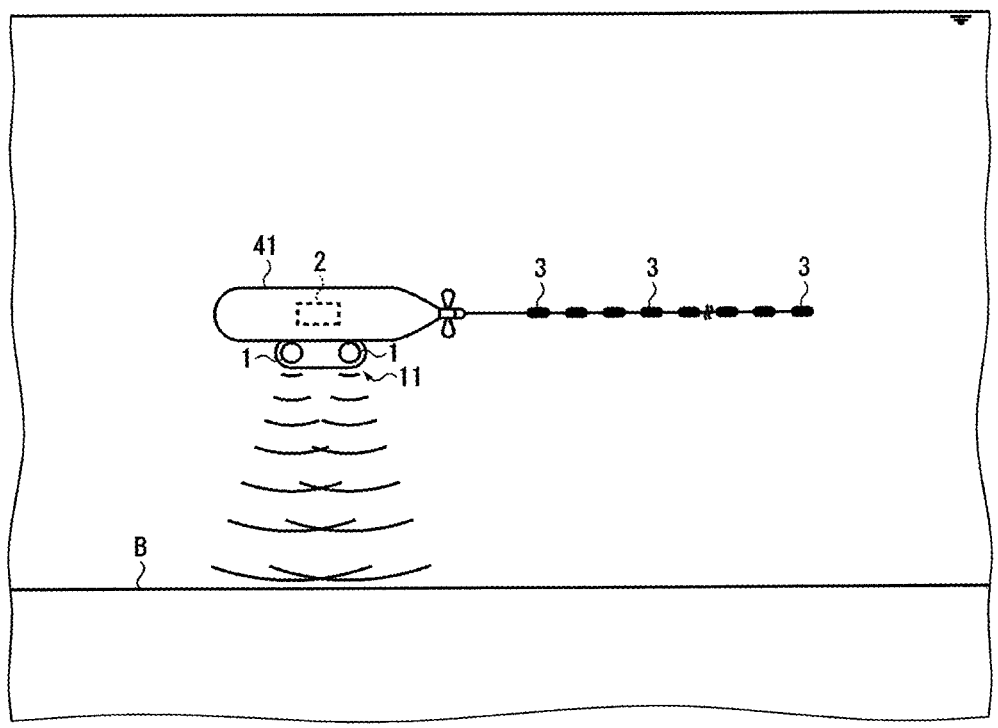
FIG. 19 is a general diagram of the subaqueous underground survey system according to other embodiments of the present invention, showing the eighth embodiment of the system.
Figure 20:
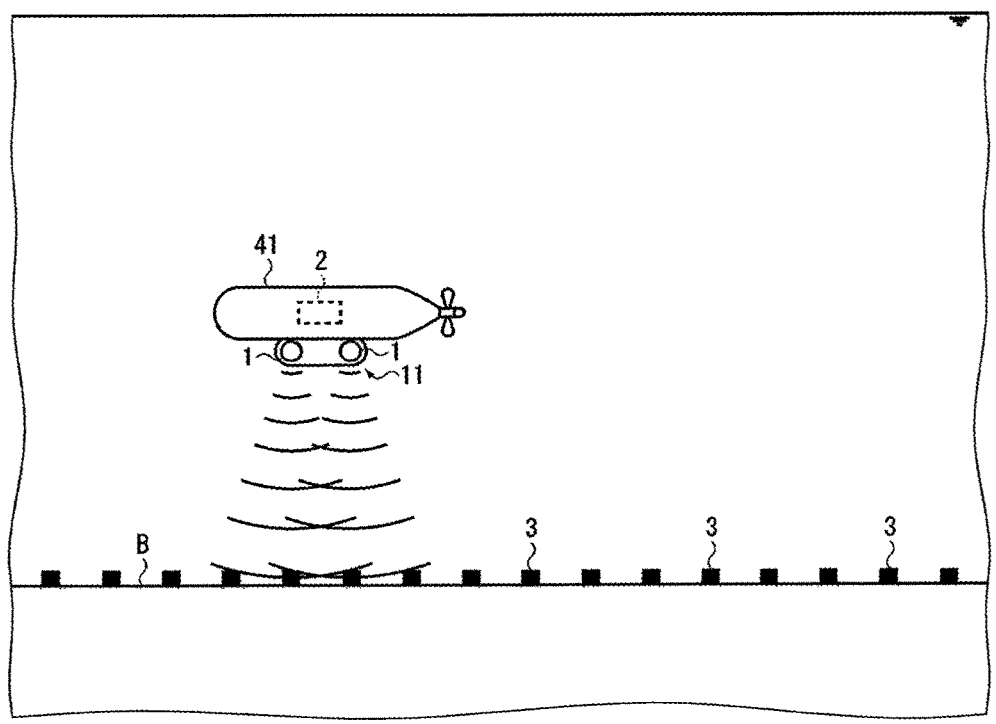
FIG. 20 is a general diagram of the subaqueous underground survey system according to other embodiments of the present invention, showing the ninth embodiment of the system.

Hereinafter, the subaqueous underground survey system according to other embodiments of the present invention will be described with reference to FIG. 13 to FIG. 20. FIG. 13 to FIG. are general diagrams of the subaqueous underground survey system according to other embodiments of the present invention; FIG. 13 shows the second embodiment, FIG. 14 shows the third embodiment, FIG. 15 shows the fourth embodiment, FIG. 16 shows the fifth embodiment, FIG. 17 shows the sixth embodiment, FIG. shows the seventh embodiment, FIG. 19 shows the eighth embodiment, and FIG. 20 shows the ninth embodiment. Note that the same reference numerals are given to the same elements as those in the aforementioned subaqueous underground survey system according to the first embodiment, and overlapping description will be omitted.

The subaqueous underground survey system according to the second embodiment shown in FIG. 13 includes multiple sound sources 1a, 1b respectively installed in different low-frequency generators 11a, 11b. Using a configuration that physically separates the multiple sound sources 1a, 1b from each other, it is possible to secure a greater distance between the sound sources 1a, 1b. The low-frequency generators 11a, 11b are connected to and towed by the observation ship 4 through respective tow lines 12a, 12b, and respective lifting apparatuses 13a, 13b, for example. In the second embodiment, it is configured such that the heights in the water of the low-frequency generators 11a, 11b are maintained at substantially the same level, and sound waves having a phase difference are generated from the respective sound sources 1a, 1b, thereby generating shear waves at the water bottom surface B.

Although not shown in the drawing, the geophone 3 may be connected to a rear end of the low-frequency generator 11b in the downstream, may be towed by the observation ship 4 other than the low-frequency generators 11a, 11b, or may be towed by a towing boat other than the observation ship 4.

The subaqueous underground survey system according to the third embodiment shown in FIG. 14 includes the multiple sound sources 1a, 1b respectively installed in the different low-frequency generators 11a, 11b, and the low-frequency generators 11a, 11b are configured to have a difference in height in the water therebetween. In particular, it is preferable to control the heights in the water of the low-frequency generators 11a, 11b to deviate from each other by a half wavelength of the sound wave generated from the sound sources 1a 1b. Note that the difference in height in the water is not limited to a half wavelength of the sound wave, but may be set to be any wavelength within a range from 0 to ½.

In the third embodiment, the phase difference of the sound waves at the water bottom surface B are controlled by controlling the heights in the water of the sound sources 1a, 1b, and the sound waves generated from the sound sources 1a, 1b preferably have coordinate phases. The heights in the water of the low-frequency generators 11a, 11b are controlled by a hydraulic gauge (not shown) and the controller 2. Of course, the phase difference of the sound waves at the water bottom surface B may be controlled by controlling both the heights in the water of the sound sources 1a, 1b and the phase difference of the sound waves generated from the sound sources 1a, 1b. The other configurations are the same as those of the above described second embodiment, and thus detailed description thereof will be omitted herein.

The subaqueous underground survey system according to the forth embodiment shown in FIG. 15 is configured such that the multiple sound sources 1a, 1b are respectively installed in the different low-frequency generators 11a, 11b, the low-frequency generators 11a, 11b are respectively connected to different observation ships 4a, 4b, and the observation ships 4a, 4b are aligned in a longitudinal direction so as to respectively tow the low-frequency generators 11a, 11b. In such a configuration, it is possible to locate the sound sources 1a, 1b at any height in the water, thereby enhancing convenience. In the fourth embodiment, the phase difference of the sound waves at the water bottom surface B may be controlled by controlling the heights in the water of the sound sources 1a, 1b, or by controlling the phase difference of the sound waves generated from the sound sources 1a, 1b.

The subaqueous underground survey system according to the fifth embodiment shown in FIG. 16 is configured such that the multiple sound sources 1a, 1b are respectively installed in the different low-frequency generators 11a, 11b, the low-frequency generators 11a, 11b are respectively connected to different observation ships 4a, 4b, and the observation ships 4a, 4b are aligned in a lateral direction so as to respectively tow the low-frequency generators 11a, 11b. In such a configuration, it is also possible to locate the sound sources 1a, 1b at any height in the water, thereby enhancing convenience. In the fourth embodiment, the phase difference of the sound waves at the water bottom surface B may be controlled by controlling the heights in the water of the sound sources 1a, 1b, or by controlling the phase difference of the sound waves generated from the sound sources 1a, 1b.

In the aforementioned fourth and fifth embodiments, the other configurations are the same as those of the above described second embodiment, and thus detailed description thereof will be omitted herein.

The subaqueous underground survey system according to the sixth embodiment shown in FIG. 17 is configured to replace the geophone 3 in the first embodiment with water-bottom installed-type geophone. In the case of using the water-bottom installed-type geophone as the geophone 3, these geophone 3 receive, at the water bottom surface B, reflected waves of the shear waves having propagated under the ground while these reflected waves remain as the shear waves. For example, an OBC (ocean bottom cable), an OBS (ocean bottom seismometer), or the like may be used as the water-bottom installed-type geophone.

Figure 18:
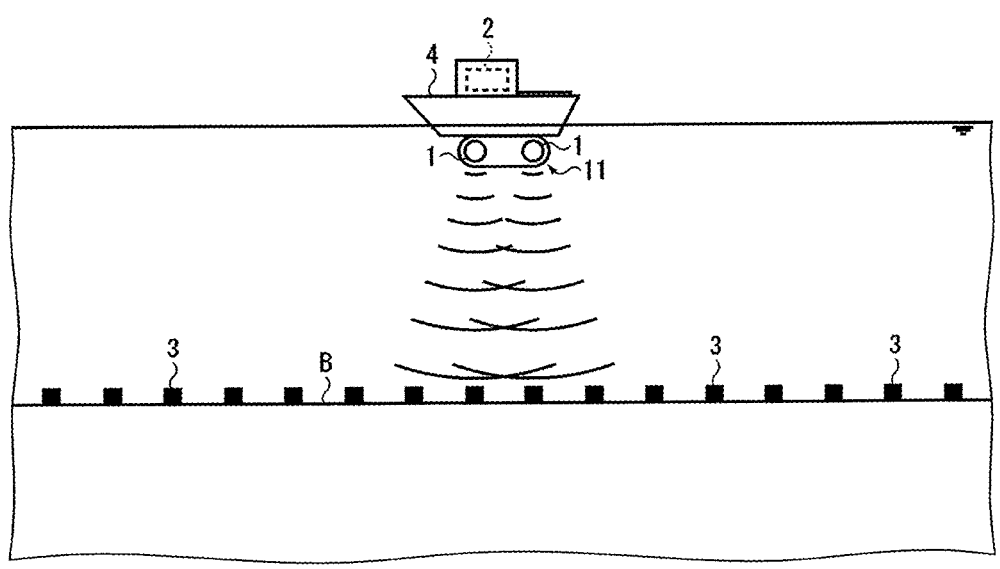
FIG. 18 is a general diagram of the subaqueous underground survey system according to other embodiments of the present invention, showing the seventh embodiment of the system.

The subaqueous underground survey system according to the seventh embodiment shown in FIG. 18 is configured to install the low-frequency generators 11 (sound sources 1) in the sixth embodiment at the bottom of the observation ship 4. Through this configuration, it is also possible to convey the sound sources 1 to any subaqueous area. The geophone 3 may be water-bottom installed-type geophone or towed-type geophone.

In the subaqueous underground survey system according to the eighth embodiment shown in FIG. 19, and in the subaqueous underground survey system according to the eighth embodiment shown in FIG. 20, the survey equipment includes a self-traveling underwater sailing body 41. In these embodiments, the underwater sailing body 41 is capable of traveling at a predetermined height in the water, and thus the underwater sailing body 41 is preferably equipped with the low-frequency generators 11 (sound sources 1). The geophone 3 may be towed-type geophone in the eighth embodiment as shown in FIG. 19, or the water-bottom installed-type geophone in the ninth embodiment as shown in FIG. 20.

The present invention is not limited to the aforementioned embodiments, and it is natural that various modifications can be made without departing from the spirit of the present invention, such that the first to ninth embodiments may be appropriately used in combination with one another if necessary.

EXPLANATION OF REFERENCE SIGNS 1, 1a, 1b sound source
2 controller
3 geophone
4, 4a, 4b observation ship
11, 11a, 11b low-frequency generator
12, 12a, 12b tow line
13, 13a, 13b lifting apparatus
41 underwater sailing body

The invention claimed is:

1. A subaqueous underground survey system using a reflection seismic survey method,
the subaqueous underground survey system comprising:
multiple sound sources for generating sound waves in water;
a controller for controlling phases of the sound waves;
a geophone for receiving reflected waves of the sound waves; and
survey equipment equipped with the sound sources,
wherein
the controller controls heights in the water of the sound sources to deviate from each other by a half wave length of a sound wave to be generated or the controller controls phase difference of the sound sources to be a half cycle so that the sound waves generated from the respective sound sources have a phase difference at a water bottom surface, thereby controlling generation of shear waves to propagate into the ground.

2. The subaqueous underground survey system according to claim 1, wherein
the sound sources are towed by the survey equipment.

3. The subaqueous underground survey system according to claim 1, wherein
the geophone include towed-type geophone or water-bottom installed-type geophone.

4. A subaqueous underground survey method using a reflection seismic survey method,
the subaqueous underground survey method comprising:
a controlling step of controlling heights in water or phases of sound sources so that sound waves generated from the respective sound sources have a phase difference at a water bottom surface;
a generating step of generating the sound waves in the water from the sound sources;
a shear-wave propagating step of generating shear waves by the sound waves at the water bottom surface so as to allow the shear waves to propagate into the ground;
a receiving step of receiving reflected waves of the shear waves; and
an analysis step of analyzing geological structures using received data on the reflected waves;
wherein the controlling step includes a step of controlling heights in the water of the sound sources to deviate from each other by a half wavelength of a sound wave to be generated, or a step of controlling the phase difference of the sound sources to be a half cycle.

5. The subaqueous underground survey method according to claim 4, wherein
the generating step includes generating the sound waves at a water surface or in the water while towing the sound sources.

6. The subaqueous underground survey method according to claim 4, wherein
the receiving step includes a step of receiving compressional waves generated from the reflected waves at the water bottom surface and propagating in the water, or a step of receiving the reflected waves at the water bottom surface while the reflected waves remain as the shear waves.

* * * * *